United States Patent [19]

Lambeth

[11] Patent Number: 4,494,868
[45] Date of Patent: Jan. 22, 1985

[54] RANGEFINDER DEVICE WITH FOCUSED ELONGATED LIGHT SOURCE

[75] Inventor: David N. Lambeth, Webster, N.Y.

[73] Assignee: Eastman Kodak Company, Rochester, N.Y.

[21] Appl. No.: 409,260

[22] Filed: Aug. 18, 1982

[51] Int. Cl.³ .......................... G01C 3/10; G03B 7/08
[52] U.S. Cl. ...................................... 356/1; 250/204; 250/553; 354/403
[58] Field of Search .............. 356/1, 4; 250/204, 553; 354/403

[56] References Cited

U.S. PATENT DOCUMENTS

| 3,599,552 | 8/1971 | Harvey | 95/44 C |
| 3,936,187 | 2/1976 | Momose | 356/1 |
| 4,248,532 | 2/1981 | Nosler | 356/1 |
| 4,269,512 | 5/1981 | Nosler | 250/204 X |
| 4,274,735 | 6/1981 | Tamura et al. | 356/1 |

Primary Examiner—S. C. Buczinski
Assistant Examiner—John B. Sotomayor
Attorney, Agent, or Firm—Thomas H. Close

[57] ABSTRACT

An improved automatic rangefinder device of the type having means for projecting a beam of light to illuminate a spot on a distant object, and an image sensor for viewing the object and determining the distance thereto by the observed position of the illuminated spot is disclosed. The rangefinder includes improved means for forming the beam of light comprising an elongated light source and projection optics for forming a real image of the light source, thereby defining an elongated beam region in space corresponding to the image of the light source, extending generally away from the rangefinder, whereby an object located in said beam region will be illuminated by a spot of light having an in-focus component. The image sensor detects the position of the in-focus component of the light. The rangefinder device includes imaging optics for imaging the spot on the image sensor. The imaging optics and the image sensor are arranged so that a real image of the image sensor formed by the imaging optics substantially coincides with the real image of the light source in the beam region of space.

14 Claims, 10 Drawing Figures

RANGEFINDER DEVICE WITH FOCUSED ELONGATED LIGHT SOURCE

BACKGROUND OF THE INVENTION

1. Field of the Invention

The present invention relates to automatic rangefinder devices of the type having means for projecting a beam of light to illuminate a spot on a distant object, and an image sensor for sensing the apparent location of the spot to determine the distance to the object; and more particularly, to an improved light source for generating said beam of light.

2. Description of the Problems

In one type of automatic rangefinder, a beam of light is projected upon an object in a scene to form an illuminated spot on the object. An image of the scene including the illuminated spot, is formed on a linear image sensor. The location of the illuminated spot on the linear image sensor is determined to measure the distance to the object in the scene. An example of such a rangefinder device for use in a photographic camera is shown in U.S. Pat. No. 4,274,735 issued June 23, 1981 to Tamura et al.

The general arrangement of elements and the mode of operation of a rangefinder device of the type shown by Tamura et al, will be described with reference to FIG. 1. The apparatus comprises a beam-forming portion shown by way of example, as a light emitting diode (LED) 10 and a lens 12. The beam is projected along a path 14 to illuminate a spot on an object $O_1$ in a scene. The scene is sensed by an image sensing portion comprising a second lens 16 and a linear array of photosensors 18. The signals produced by the photosensor array are analyzed by control electronics 20 to determine the position of the illuminated spot in the scene and to produce a signal representing the distance to the object. As shown by example in FIG. 1, the apparent position of the illuminated spot in the scene is a function of distance along light path 14 to the object. For an object $O_1$ located at a distance $D_1$ from the rangefinding device, the image of the illuminated spot will fall on the image sensor at location $S_1$. For an object $O_2$ at a further distance $D_2$, the image of the spot will fall on the image sensor at a location $S_2$. By examining the output of the image sensor, the control electronics 20 determines (for example, by comparing the output of the sensor elements to determine that output which is a maximum) the location of the illuminated spot in the scene and thereby the distance to the object.

In general, the resolution of such a rangefinder is limited by the baseline distance between the LED 10 and the image sensor 18. The ability to increase the resolution of the rangefinder by increasing the baseline distance is limited in modern compact photographic cameras.

As shown in FIG. 1, the image sensor 18 is arranged with its long axis perpendicular to the optical axis of lens 16. Since lens 16 is a very fast lens (e.g. F/1) to maximize the amount of light gathered from the scene, its depth of field will be relatively shallow and only objects at a narrow range of distance will be in focus on the image sensor 18, thereby reducing the sensitivity of the rangefinding device at other distances. Another problem encountered with the rangefinding device of the type shown in FIG. 1, is that the projected image of LED 10 is in focus at only one distance, resulting in a larger than optimum spot at all other distances. A third problem encountered with the use of a rangefinder device of the type shown in FIG. 1 in a photographic camera is the parallax that results between the beam 14 and the optical axis of the viewing or taking lens of the camera.

One solution to the problem of spot size and focus of the image on the image sensor is shown in U.S. Pat. No. 4,248,532 issued Feb. 3, 1981 to Nosler. In the rangefinder device disclosed by Nosler, the sensor array is angularly oriented relative to the optical axis of the imaging lens 16 (as shown in phantom in FIG. 1 of the present specification) to insure that the spot will remain in sharp focus on the sensor throughout the useful range of object distances. The light beam disclosed by Nosler is generated by a laser, thereby producing an optimum size spot throughout the useful range of distances.

The solutions proposed by Nosler do not solve the problem of parallax between the rangefinder axis and the optical axis of the viewing or taking lens of a photographic camera.

SOLUTION TO THE PROBLEM—SUMMARY OF THE INVENTION

The above-noted problems are solved according to my invention by providing an automatic rangefinder device of the type described above with improved means for forming the beam of light. The improved beam-forming portion comprises an elongated light source and projection optics for forming a real image of the light source, thereby defining an elongated beam region in space, corresponding to the image of the light source, and extending generally away from the rangefinder. An object located anywhere in the beam region will be illuminated with a spot of light having an in-focus component. The image sensor detects the position of the in-focus component of the spot. The rangefinder device includes imaging optics for imaging the beam region onto a linear image sensor. The imaging optics and the image sensor are arranged such that a real image of the image sensor formed by the imaging optics substantially coincides with the real image of the elongated light source in the beam region of space.

In a preferred embodiment of the invention, the light source is an edge emitting LED, arranged with respect to a projection lens such that the long axis of the light emitting portion of the LED passes through the focal point of the projection lens, thereby forming a real image of the LED lying along a line parallel to the optical axis of the projection lens, and intersecting the principal plane of the projection lens at the point where the extension of the long axis of the LED intersects the principal plane. In the preferred embodiment, the imaging optics for the image sensor is a lens having its principal plane coplanar with the principal plane of the projection lens, the linear image sensor is likewise arranged with its long axis passing through the focal point of the imaging lens and intersecting the principal plane at the same point where the long axis of the light source intersects the principal plane.

By forming a beam region off center of the optical axis of the projection lens according to the present invention, the rangefinder may be employed in optical apparatus such as a photographic camera with the beam aligned with the taking or viewing optics of the camera, thereby eliminating parallax between the rangefinder and the camera optics. Furthermore, by forming the beam region off center of the optical axis of the projection lens, the rangefinder may be arranged to have an effective baseline distance greater than the distance between the light source and the image sensor, thereby increasing the resolution of the rangefinder without increasing its physical size.

According to another feature of the invention, the projection and imaging optics are arranged such that the beam region does not lie in the same plane as the optical axis of the projection and imaging optics, thereby improving the sharpness of the image of the light source on the image sensor.

BRIEF DESCRIPTION OF THE DRAWINGS

The invention will be described with reference to the accompanying drawings, wherein.

DESCRIPTION OF THE PREFERRED EMBODIMENTS

Figure 2A:
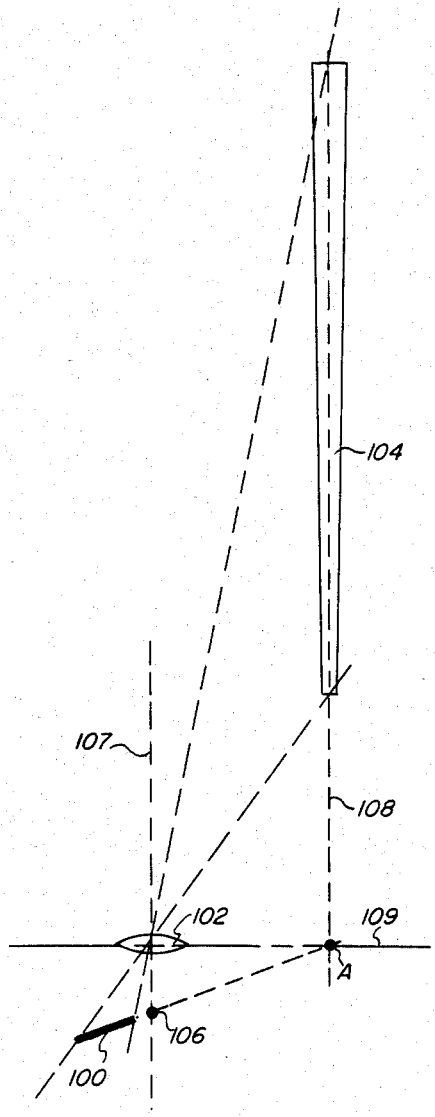
FIGS. 2a and 2b are schematic diagrams of a preferred and an alternative embodiment respectively of the light beam-forming portion of a rangefinder device according to the present invention.

Referring first to FIG. 2a, the improved beam-forming portion of a rangefinder device according to the present invention will be described. The beam-forming portion includes an elongated light source, such as an edge emitting LED 100, a means for forming a real image of the light source, such as a lens 102. The real image 104 of the light source 100 forms a beam region in space coincident with the real image 104 extending generally away from the rangefinder, any part of which contains an in-focus portion of the image of the light source. An object located anywhere in the beam will be illuminated with a spot of light that includes an intense in-focus portion, and a neighboring portion or portions that are out-of-focus and therefore less intense. By arranging the long axis of the LED to pass through the focal point 106 of lens 102, the beam region 104 will be parallel to and displaced from the optical axis 107 of projection lens 102. The beam region 104 will lie along a line 108 that intercepts the principal plane 109 of lens 102 at a point A coincident with the point that the long axis of the LED intercepts the principal plane.

Figure 2B:
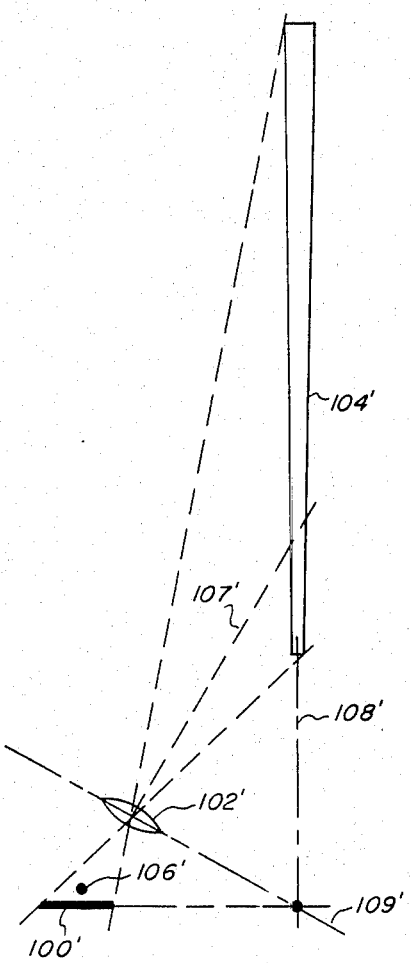

To create the elongated beam region in space, it is not necessary that the long axis of the LED pass through the focal point of the projection lens. FIG. 2b (numbered similarly to FIG. 2a, with primes (')) shows an alternative arrangement of the LED 100' and projection lens 102' wherein the long axis of the LED 100' does not pass through the focal point 106' of the lens. The beam region 104' in this case, is not parallel to the optical axis 107' of the projection lens 102'. The arrangement must be tilted slightly as shown in FIG. 2b to make the beam region 104' parallel with the beam region 104 shown in FIG. 2a.

Figure 1:
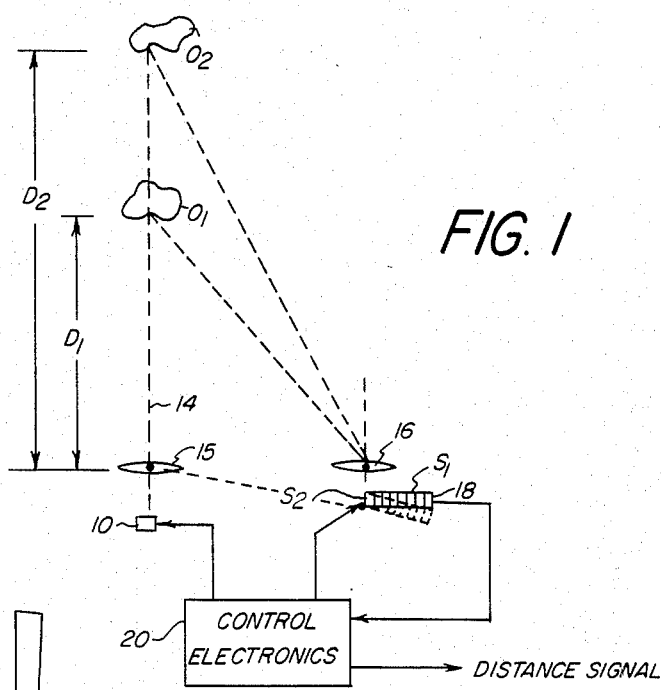
FIG. 1 is a schematic diagram of a rangefinder device of the type to which the present invention pertains.
Figure 3:
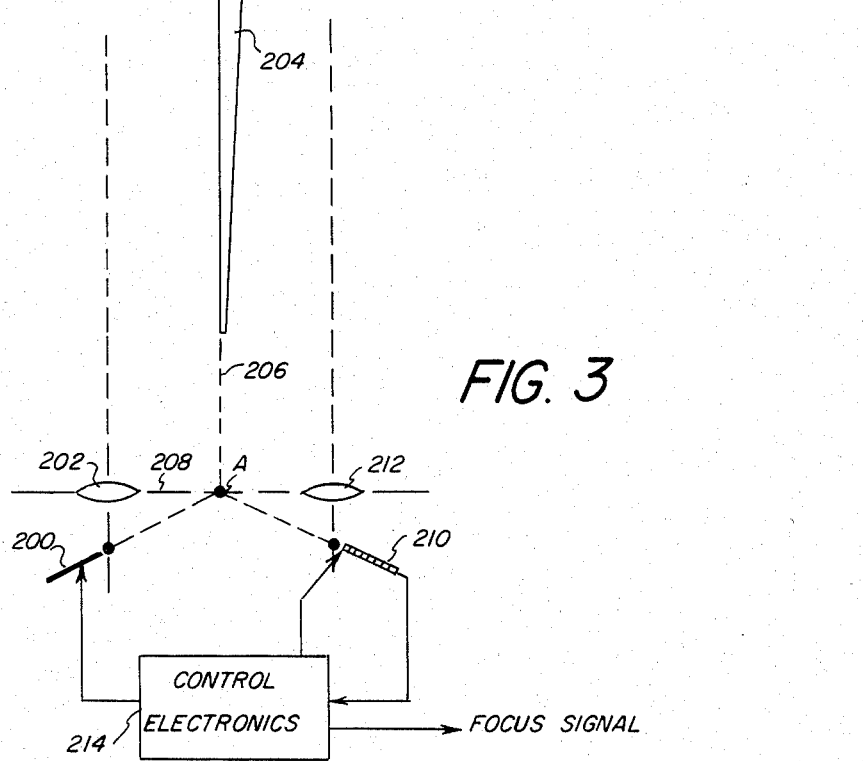
FIG. 3 is a schematic diagram showing a rangefinder device according to the present invention, including a focused elongated light source according to the present invention.

FIG. 3 illustrates a rangefinder device according to the present invention, employing the improved beamforming apparatus shown in FIG. 2a. The beamforming portion of the rangefinder includes an elongated light source such as an edge emitting LED 200, and a projection lens 202 for projecting a real image 204 of the light source to form a beam region coincident with the real image in space. The image of the light source lies along a line 206 that intersects the principal plane 208 of lens 202 at point A. The beam region 204 is imaged onto a linear image sensor 210 by an imaging lens 212. The linear image sensor 210 and imaging lens 212 are arranged such that a real image of the image sensor 210 projected by the imaging lens 212 substantially coincides with the real image 204 of light source 200. This is accomplished for example as shown in FIG. 3, by positioning the lens 212 to be coplanar with lens 202, and arranging linear image sensor 210 along a line passing through the focal point of lens 212 and intersecting the principal plane at point A.

With the above-described arrangement, an object positioned anywhere in beam region 204 will be illuminated with a spot that has an in-focus component, and the portion of the object illuminated by the in-focus spot will be sharply imaged onto the appropriate portion of the linear image sensor 210.

The location of the in-focus component of the spot is determined by the portion of the image sensor receiving the most intense light.

Control electronics 214 receives the signal from the linear image sensor 210 and generates a focus signal in response thereto in a known manner.

In the preferred embodiment of the invention, lenses 202 and 212 are 12.5 mm focal length F/1 lenses. The LED 200 is an edge emitting LED with an elongated rectangular light emitting surface approximately 1.5×0.05 mm. The image sensor 210 is a self-scanned CCD sensor with provision for automatically subtracting background illumination. An example of such an image sensor is shown in copending U.S. patent application No. 409,256, entitled "Image Sensor and Rangefinder Device Having Background Subtraction with Paired Analog Shift Registers" by C. Anagnostopoulos filed on even date herewith. The image sensing array 210 is approximately 1.5×0.5 mm wide and contains 32 individual sensor elements.

Since the beam region 204 lies off the optical axis of both the projecting lens 202 and the imaging lens 212, a rangefinder according to the present invention used in optical apparatus such as a camera, can be constructed so that the beam 204 lies along the optical axis of the taking optics of the camera, thereby eliminating parallax between the rangefinder and the camera optics.

Figure 4:
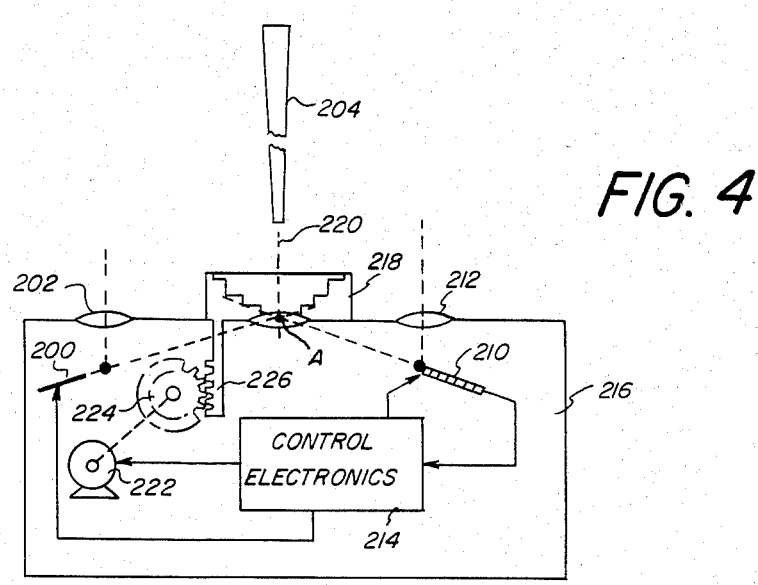
FIG. 4 is a schematic diagram illustrating the use of the rangefinder device shown in FIG. 3 in a photographic camera of the single lens reflex type, showing the axis of the rangefinder device aligned with the optical axis of the taking lens of the camera.

FIG. 4 is a schematic diagram showing a rangefinder such as that illustrated in FIG. 3 in a camera of the single lens reflex type. The camera 216 includes a taking lens 218 having an optical axis 220. The beam-forming portion of the viewfinder, including elongated light source 200 and projecting lens 202, is positioned on one side of taking lens 218 such that beam 204 lies along the optical axis 220 of the taking lens. The image forming portion of the rangefinder including linear image sensor 210 and imaging lens 212, is positioned on the opposite side of the taking lens 218 such that the beam region 204 is focused onto linear image sensor 210. The focus signal generated by control electronics 214 is employed to control a focus servo depicted as a focus motor 222 connected to a pinion 224 to drive a rack 226 connected to lens 218.

Figure 5:
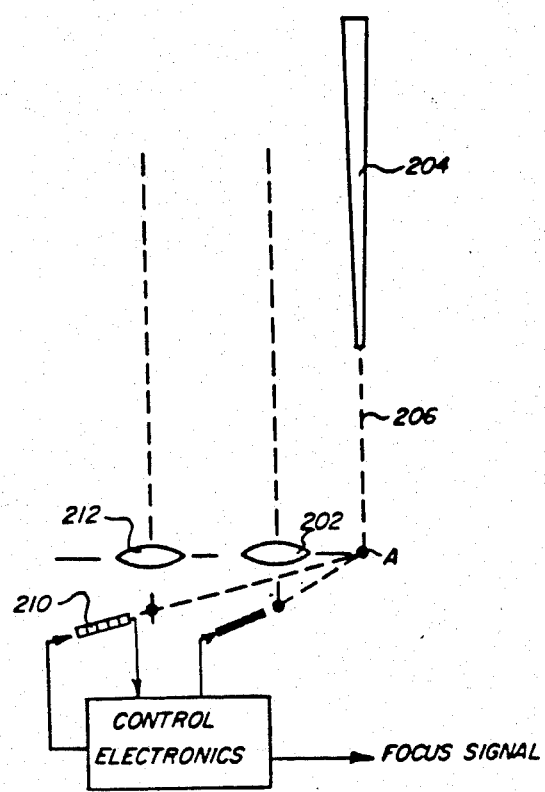
FIG. 5 is a schematic diagram of an alternative embodiment of a rangefinding device according to the present invention.
Figure 6:
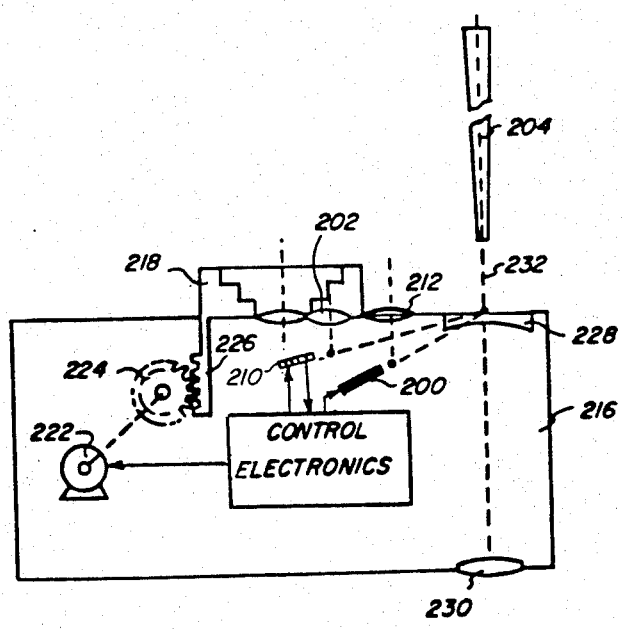
FIG. 6 is a schematic diagram of the rangefinding device shown in FIG. 5 employed in a photographic camera of the viewfinder type, with the axis of the rangefinder device aligned with the optical axis of the viewfinder of the camera.

Although the beam region 204 is shown approximately midway between the two lenses 202 and 212 in FIGS. 3 and 4, the beam region may be adjusted toward one lens or the other by simultaneously varying the angle of the elongated light source and the image sensor to move the point A back or forth between the two lenses. The beam region may even be displaced past one of the lenses to reside along some line outside the rangefinder device itself. With such an arrangement of parts, the beam may be displaced away from the sensor array to produce an effective baseline distance that is greater than the distance between the light source and the image sensor, thereby allowing the resolution of the rangefinder to be increased without increasing the physical size of the rangefinder. FIG. 5 shows an example of such an arrangement where similar parts are similarly numbered. This arrangement may be employed to advantage for example, in a viewfinder type camera to place the beam region along the optical axis of a viewfinder lens. FIG. 6 shows schematically how such an arrangement can be employed in a viewfinder camera. A camera 216 includes a viewfinder having optical elements 228 and 230 defining an optical axis 232. The rangefinder device is positioned in the camera so that the beam region 204 lies along optical axis 232. The baseline distance of the rangefinder shown in FIG. 6 is the distance between the image sensor 210 and the optical axis 232, which is seen to be larger than the distance between the LED 200 and the image sensor 210.

Figures 7, 9:
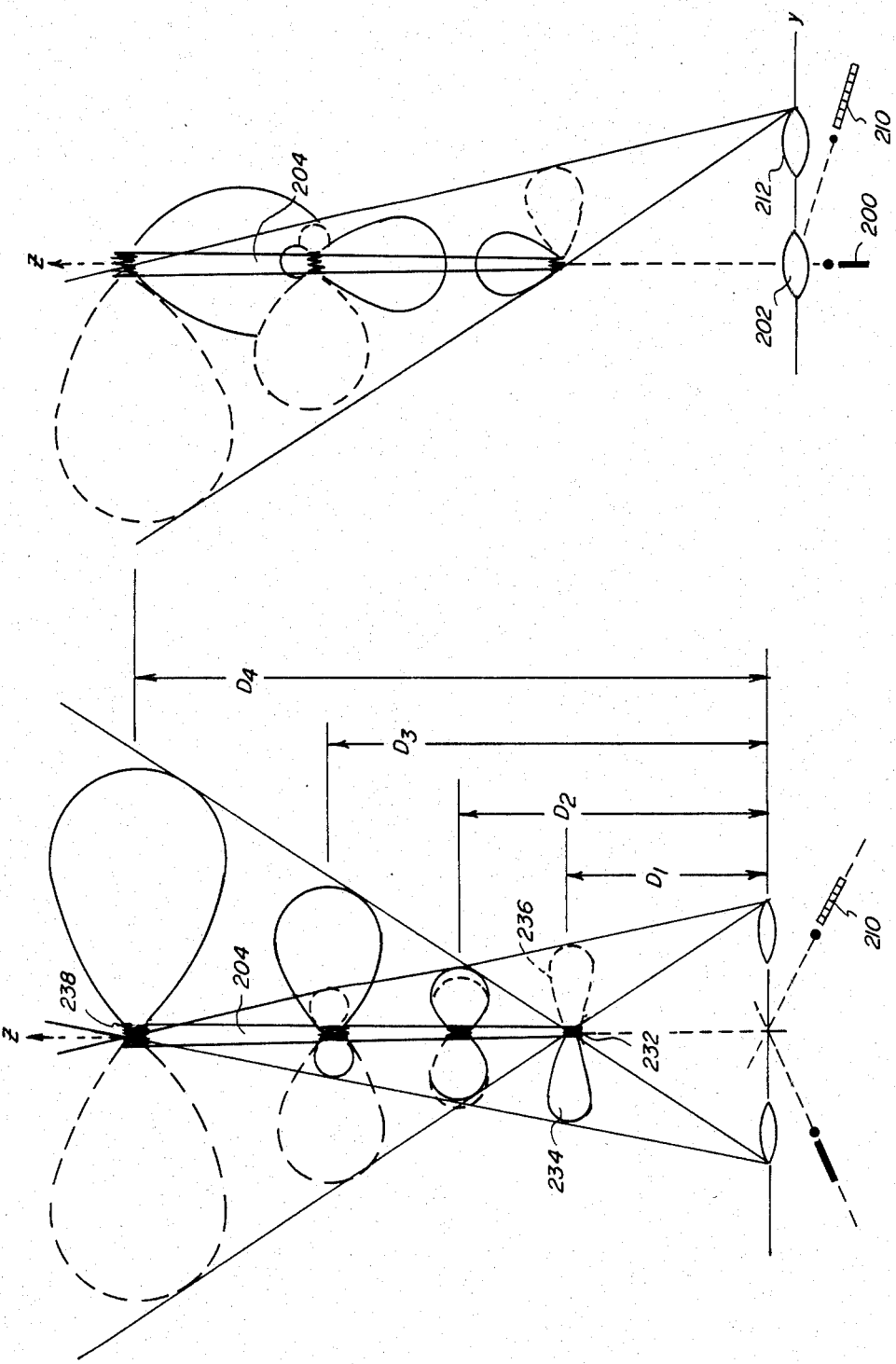
FIG. 7 is a schematic diagram illustrating the overlapping patterns of projected light spots and the projected image of the image sensor falling on objects located at various distances from a rangefinding device configured as shown in FIG. 3.
FIG. 9 is a schematic diagram illustrating the overlapping patterns of projected light spots and the projected image of the image sensor falling on objects located at various distances from a rangefinder device configured as shown in FIG. 8.

In the embodiments discussed thus far, the light source and the image sensor reside in a common plane. With this arrangement, light falling on an object will form a comet- or butterfly-shaped spot with an intense narrow in-focus portion and less intense larger out-of-focus portion or portions. FIG. 7 schematically depicts the pattern of light formed on objects at several distances $D_1$, $D_2$, $D_3$, and $D_4$, from the rangefinder. The pattern of light at distance $D_1$ is a comet-shaped pattern comprising an in-focus portion outlined by shaded area 232, and an out-of-focus portion represented by solid line 234. The spots formed at other distances $D_2$, $D_3$, and $D_4$ are similarly depicted by in-focus shaded portions and out-of-focus portions outlined by a solid line. As can be seen from FIG. 7, the spots formed at the near and far distances are single lobed, resembling comets. The spots formed at intermediate distances are double lobed, resembling butterflies. Also depicted in FIG. 7 is the projected image of the image sensing array 210 projected at the various distances $D_1$–$D_4$. The projected image of the image sensing array 210 at distance $D_1$ similarly comprises an in-focus portion 232 and an out-of-focus portion 236 shown in phantom. As can be seen from FIG. 7, at the near and far distances, the only portions of the images which overlap are the in-focus portions 232 and 238 respectively, thereby resulting in sharp definition of the spot on the image sensor. As can be seen in FIG. 7, at the intermediate distances represented by $D_2$ and $D_3$, portions of the out-of-focus spot fall out of focus on the image sensor 210, thereby reducing the definition of the in-focus portion of the spot on sensor 210.

Figure 8:
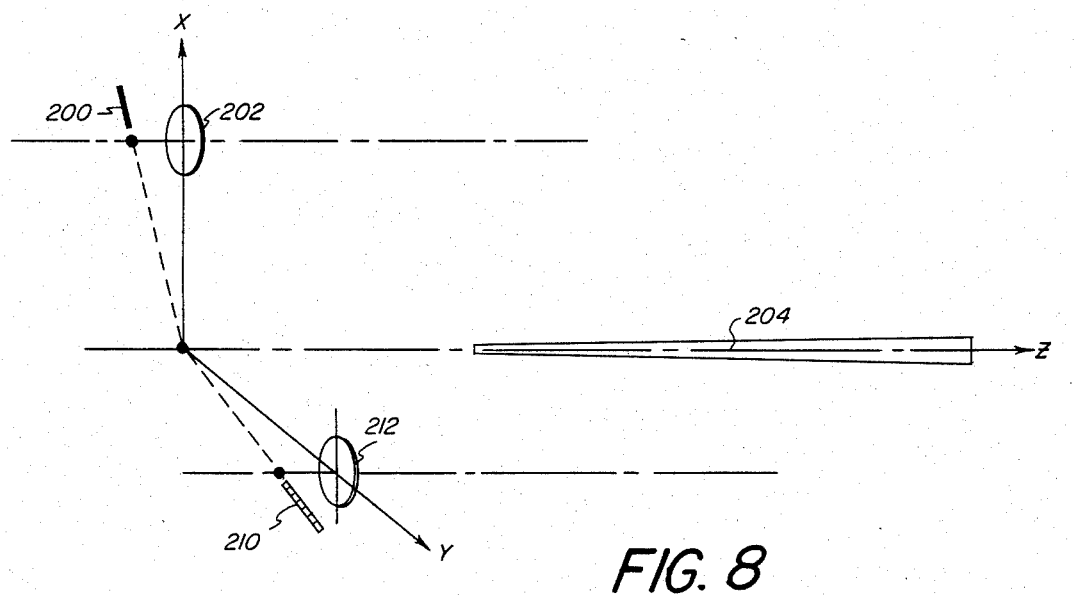
FIG. 8 is a schematic perspective diagram of an arrangement for further improving the response of a rangefinder device according to the present invention.

This effect can be reduced by causing the images of the light source and the image sensor to intersect each other at an angle, preferably a right angle, such that the out-of-focus portions of the illuminated spot fall off the image sensor to one side or the other. FIG. 8 is a perspective view of an optical arrangement of a rangefinding device according to the present invention which accomplishes this goal. As shown in FIG. 8, the projection lens 202, the imaging lens 212, and the beam region 204 lie at right angles to each other on orthogonal axes X, Y and Z in space. FIG. 9 depicts the pattern of illuminated spots and projected images of the image sensor 210 at various distances along the beam 204. As can be seen in FIG. 9, the only portions of the illuminated spot and the projection of the image of image sensor 210 which overlap are in the region where both images are in focus, thereby providing a sharp definition of the spot at all locations along beam region 204.

The invention has been described in detail with particular reference to preferred embodiments thereof, but it will be understood that variations and modifications can be effected within the spirit and scope of the accompanying claims.

For example, although a continuous elongated light source has been disclosed, it will be obvious that a linear array of discrete light sources could be substituted therefore within the spirit of the invention.

I claim:

1. A rangefinder device, comprising:
  (a) means for illuminating a spot on an object in a scene, including:
    (1) an elongated light source having a longitudinal axis, and
    (2) a first lens positioned with respect to the elongated light source such that the longitudinal axis of the light source intersects the principle plane of the first lens for projecting a real image of said light source, said real image defining an elongated beam region extending generally parallel to and displaced from the optical axis of the lens whereby an object located in said beam region will be illuminated with a spot of light having an in-focus component; and
  (b) means for viewing the scene to determine the distance to the object by detecting the apparent location of the in-focus component of the illuminated spot in the scene, including:
    (1) a linear image sensor having a longitudinal axis, and
    (2) a second lens positioned with respect to the linear image sensor such that the longitudinal axis of the linear image sensor intersects the principle plane of the second lens for forming an image of said elongated beam region on said linear image sensor.

2. The invention claimed in claim 1, wherein the principle planes of said first and second lenses are coplanar, and the longitudinal axis of said elongated light source and said linear image sensor intersect said planes at the same point.

3. The invention claimed in claim 1, wherein said illuminating means and said viewing means are arranged such that the long axis of said beam region lies outside of the region between said viewing means and said illuminating means, thereby increasing the effective baseline distance of the rangefinder device without increasing the physical size of the device.

4. The invention claimed in claim 1, wherein the longitudinal axis of said elongated light source passes through the focal point of said first lens, whereby the longitudinal axis of said beam region is parallel with the optical axis of said first lens, and intersects the principal plane of said first lens at the point where the longitudinal axis of the light source intersects said principal plane.

5. The invention claimed in claim 4, wherein the optical axis of said second lens is parallel to the optical axis of said first lens, and wherein the longitudinal axis of said linear image sensor passes through the focal point of said second lens, and intersects the principal plane of said second lens at a point where the longitudinal axis of said elongated beam region intersects the principal plane of said second lens.

6. The invention claimed in claim 1, wherein said elongated light source is an LED.

7. The invention claimed in claim 6, wherein said LED is an edge-emitting LED.

8. The invention claimed in claim 1, wherein said rangefinder device is employed in combination with optical apparatus, and wherein the longitudinal axis of said beam region is coincident with the optical axis of the optics of said optical apparatus, thereby eliminating parallax between said rangefinder device and the optics of said optical apparatus.

9. The invention claimed in claim 8, wherein said optical apparatus is a photographic camera having a taking lens, and the longitudinal axis of said beam region is substantially coincident with the optical axis of said taking lens.

10. The invention claimed in claim 8, wherein said optical apparatus is a photographic camera having a viewfinder lens and the longitudinal axis of said beam region is substantially coincident with the optical axis of said viewfinder lens.

11. The invention claimed in claim 1, wherein said illuminating means and said viewing means are arranged such that substantially only the in-focus component of said illuminated spot falls on said image sensor.

12. The invention claimed in claim 5, wherein the longitudinal axis of said beam region lies outside of the plane of the optical axes of said first and second lenses, whereby substantially only the in-focus component of an illuminated spot will fall on the image sensor.

13. In combination with optical apparatus, having an optical axis, a rangefinder device comprising:
  (a) means for illuminating a spot on an object, including:
    (1) an elongated light source having a longitudinal axis, and
    (2) a first lens positioned with respect to the elongated light source such that the longitudinal axis of the light source intersects the principle plane of the first lens for projecting a real image of said light source, said real image defining an elongated beam region extending generally along the optical axis of said optical apparatus, whereby an object located in said beam region will be illuminated with a spot of light having an in-focus component; and
  (b) means for determining the distance to the object by detecting the apparent location of the in-focus component of the spot, including:
    (1) a linear image sensor having a longitudinal axis, and
    (2) a second lens for forming an image of said beam region on said image sensor, whereby, parallax between said rangefinder and said optical apparatus is avoided.

14. In combination with a photographic camera, a rangefinder device, comprising:
  (a) means for illuminating a spot on an object, including:
    (1) an elongated light source,
    (2) a first lens, having a first optical axis, for projecting a real image of said light source said real image defining an elongated beam region extending along a beam axis generally parallel to and displaced from said first optical axis, whereby an object located in said beam region will be illuminated by a spot of light having an in-focus component; and
  (b) means for determining the distance to the object by detecting the apparent location of the in-focus component of the spot, including:
    (1) a linear image sensor, and
    (2) a second lens having a second optical axis for focusing said beam region on said image sensor, said image sensor and second lens being arranged such that the distance between said second optical axis and said beam axis is greater than the distance between said first and second optical axes, whereby the baseline distance of said rangefinder device is effectively increased without increasing the physical dimensions of the device.

* * * * *